United States Patent
Kelly et al.

(10) Patent No.: US 8,798,960 B1
(45) Date of Patent: Aug. 5, 2014

(54) APPLICATION PERFORMANCE ANALYSIS FOR A MULTIPLE PROCESSOR QUEUING STATION

(75) Inventors: Terence Kelly, Mountain View, CA (US); Alex Zhang, San Jose, CA (US); Christopher Stewart, Rochester, NY (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1680 days.

(21) Appl. No.: 12/260,771

(22) Filed: Oct. 29, 2008

Related U.S. Application Data (60) Provisional application No. 61/077,531, filed on Jul. 2, 2008.

(51) Int. Cl.
*G06F 19/00* (2011.01)

(52) U.S. Cl.
USPC .......... 702/182; 702/183; 702/185; 702/186; 709/223

(58) Field of Classification Search
USPC ............... 702/182, 183, 185–186; 703/22; 709/223
See application file for complete search history.

(56) References Cited

U.S. PATENT DOCUMENTS

| | | | |
|---|---|---|---|
| 6,823,054 B1* | 11/2004 | Suhm et al. | 379/134 |
| 2002/0172229 A1* | 11/2002 | Parvin et al. | 370/521 |
| 2006/0224375 A1* | 10/2006 | Barnett et al. | 703/22 |
| 2008/0168560 A1* | 7/2008 | Durie et al. | 726/23 |

\* cited by examiner

*Primary Examiner* — Jonathan C Teixeira Moffat
*Assistant Examiner* — Hien Vo (57) ABSTRACT

A technique includes monitoring a first cumulative number of transactions arriving into a processing station and monitoring the second cumulative number of transactions completed by the station. The technique includes based on the first and second cumulative numbers, determining at least one of a transaction waiting time of the station and a predicted reduction in the transaction waiting time due to processor expansion.

18 Claims, 5 Drawing Sheets

APPLICATION PERFORMANCE ANALYSIS FOR A MULTIPLE PROCESSOR QUEUING STATION

CROSS-REFERENCE TO RELATED APPLICATIONS

This Application claims the benefit of U.S. Provisional patent application Ser. No. 61/077,531, filed Jul. 2, 2008, which is hereby incorporated by reference in it's entirety.

BACKGROUND

An ever-increasing number of modern computer systems have multiple processors. As examples, a typical modern computer system may have multiple processing cores in a multi-core microprocessor package, as well as possibly multiple (multiple core or single core) microprocessor packages. Additionally, a typical modern computer system may be formed from multiple microprocessor packages in a single "box" or multiple microprocessor packages that are distributed in rack-mounted units.

Due to the number of processors in a modern computer system, it is increasingly possible and attractive to co-locate all components of a large complex application on a single multiple-processor host. However, the trend toward increasing the numbers of processors presents challenges in understanding how the application performs on the computer system. Therefore, challenges exist in monitoring the performance of the application and evaluating the benefits that may be gained by expanding the number of processors of the computer system.

DETAILED DESCRIPTION

Figure 1:
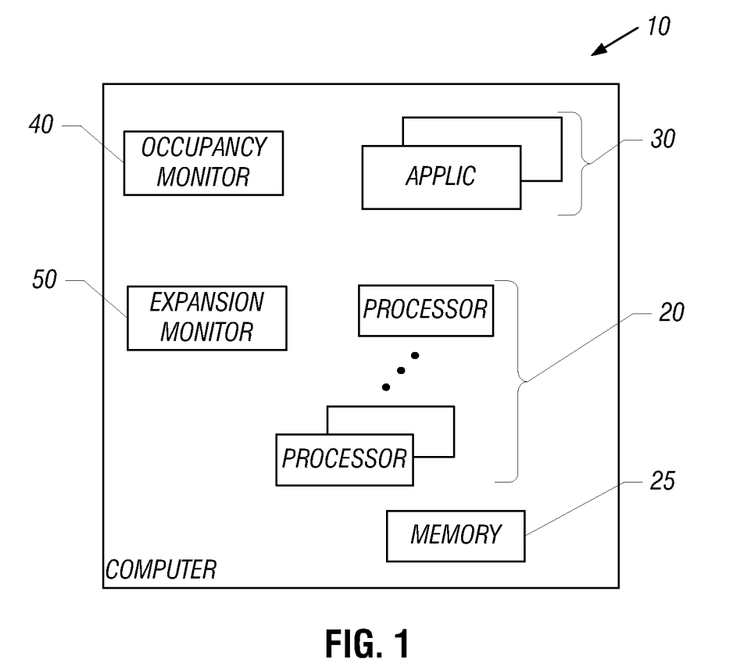
FIG. 1 is a schematic diagram of a computer according to an embodiment of the invention.

Referring to FIG. 1, in accordance with embodiments of the invention described herein, the performance of an application 30 executing on a computer 10 is gauged by treating the application 30 as a "black box" and monitoring the transaction arrivals to and the transaction departures (i.e., the completed transactions) from the application 30. As described below, such determinations as processor utilization and performance enhancements due to processor expansion may be made without specific knowledge of the interactions of the application or the matching of specific transaction arrivals with specific transaction departures.

In general, the computer 10 includes certain physical hardware, such as a system memory 25 and k processors 20. Depending on the particular embodiment of the invention, as examples, each processor 20 may be a central processing unit (CPU), such as a single core microprocessor package or a processing cores of multiple core microprocessor package.

As examples, the computer 10 may be a single "box;" may contain multiple and/or single core processor packages; and/or may include racks of machines, which are connected by one or more local networks. For the latter multiple rack arrangement, a single queue is assumed, such as, for example, a rack of machines that is managed centrally by a single job dispatcher with a single job queue.

The computer 10 may include software, such as various application programs 30 and occupancy 40 and expansion 50 monitors. The occupancy monitor 40 analyzes arriving and outgoing transactions to and from the processors 20 due to a given application workload to determine whether corrective action should be undertaken based on the observed transactions. The expansion monitor 50 analyzes the arriving and outgoing transactions to and from the processors 20 due to a given application workload for purposes of predicting a reduction in the transaction waiting time due to a hypothetical expansion of the number of processors 20.

As described further below, the transaction measurements that are analyzed by the occupancy 40 and capacity 50 monitors may be lightweight passive external measurements. Thus, the measurements do not require knowledge of the internal operations of the observed system. Therefore, the occupancy 40 and expansion 50 monitors may be part of the computer 10 (as shown in FIG. 1) and/or may be external to the computer 10, depending on the particular embodiment of the invention. For example, the occupancy monitor 40 may be a "network sniffer," such as the Mercury Real User Monitor (as a non-limiting example), which is external to the computer 10 and is coupled to a network that is in communication with the computer 10.

As described herein, the occupancy monitor 40 monitors arriving and outgoing transactions to and from the processors 20 for purposes of determining and evaluating both the transaction queuing and service times associated with the execution of a particular application 30. Based on these determined times, the occupancy monitor 40 may determine such application performance attributes as transaction waiting time and transaction service time. The occupancy monitor 40 may determine whether corrective action should be undertaken (the occupancy monitor 40 determines whether an alarm or an automated action should be undertaken, as examples) based on the monitored performance; and the occupancy monitor 40 may initiate automatic corrective action based on the determination. The expansion monitor 50 analyzes the arriving and outgoing transactions to and from the processors 20 for purposes of predicting a reduction in the transaction waiting time due to a hypothetical expansion of the number of processors 20. As described below, the expansion monitor 50 may also determine if an automated action (such as increasing the number of processors 20 allocated to a given application, for example) is needed based on the predicted reduction waiting and other factors and selectively initiate the action based on this determination.

Figure 2:
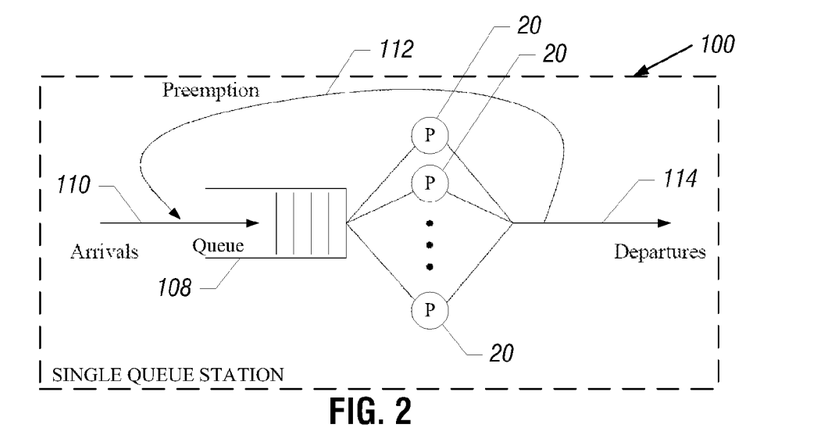
FIG. 2 is a schematic diagram of single queue station having multiple processors according to an embodiment of the invention.

Referring to FIG. 2, in accordance with embodiments of the invention, the computer 10 may be modeled as a single-queue station 100 that has k identical processors 20 and whose workload consists of processing arriving transactions 110 (attributable to the application 30 under observation). The arrivals of the transactions processed by the station 100 are open, which means that the processing of the transactions is independent of the current state and past history of the station 100. Each transaction demands a fixed amount of service that is independent of the number, nature and location of other transactions in the station 100.

More specifically, a particular arriving transaction 110 is temporarily stored in a queue 108 of the station 100 until the transaction 110 is processed. After the station 100 processes the arriving transaction 110, the transaction 110 departs the station 100 to form a completed, or departing transaction 114. The difference between the departure and arrival times of a transaction defines the transaction response time of the station 100. The response time is the sum of 1.) the queuing, or waiting time (i.e., time spent in the queue 108); and 2.) the service time (i.e., time elapsed while the transaction is being served by one of the processors 20).

For this model of the station 100, individual transactions are not served in parallel. In other words, a single transaction occupies at most one processor 20 at a time. However, different transactions may simultaneously receive service at different processors 20, with at most one transaction present in a processor 20 at any instant.

A transaction may receive service in installments. In other words, a particular transaction may alternate between the queue 108 and the processors 20 (as indicated by an exemplary preemptive transaction 112) until the total amount of time that a transaction has occupied a processor 20 equals its service demand. A transaction waiting in the queue 108 is immediately assigned to an idle processor 20 whenever an idle processor 20 is available.

The station 100 is presumed initially empty at time t=0 in the following discussion, and the number of transactions present in the station 100 at time t may be described as follows:

$$N_k(t) = A(t) - D_k(t),\qquad \text{Eq. 1}$$

where "$N_k(t)$" represents the number of transactions and is also called an "occupancy curve" herein; "$A(t)$" represents the number of transaction arrivals; and "$D_k(t)$" represents the number of transaction completions, or departures.

Figure 3:
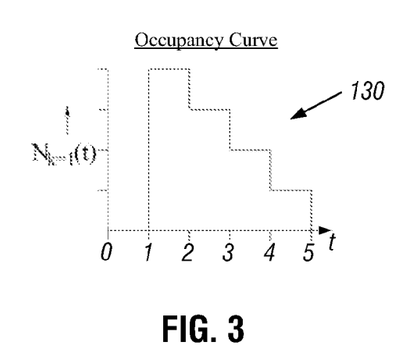
FIG. 3 depicts an exemplary occupancy curve for a single queue station that has a single processor according to an embodiment of the invention.
Figure 4:
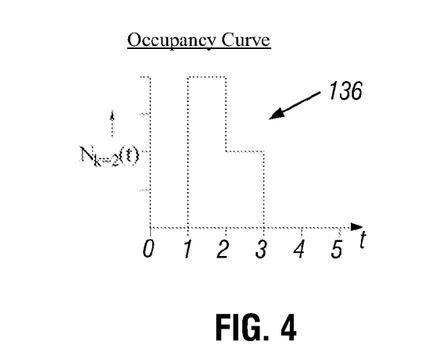
FIG. 4 depicts an exemplary occupancy curve for a single queue station that has two processors according to an embodiment of the invention.

As a more specific example, FIGS. 3 and 4 illustrate two exemplary occupancy curves 130 and 136 for a one processor station and a two processor station, respectively. In FIG. 3, the notation "$N_{k=1}(t)$" refers to an occupancy curve for one processor, and likewise in FIG. 4, the notation "$N_{k=2}(t)$" refers to an occupancy curve for two processors. The occupancy curves 130 and 136 are for the same application workload: four transactions, with each requiring unit service and with each arriving at time t equal to 1.

There are several noteworthy characteristics of occupancy curve $N_k(t)$. First, the area under the occupancy curve $N_k(t)$ represents the sum of response times across all transactions in the workload. Second, the shape of the occupancy curve $N_k(t)$ may depend upon the queue discipline as well as a number of processors 20. Third, the occupancy curve $N_k(t)$ may be obtained by observing the number of arriving transactions 110 (see FIG. 2) and departing transactions 114 (see FIG. 2), without associating specific departures with the corresponding arrivals. Thus, merely counting $A(t)$ and $D_k(t)$ is sufficient for purposes of determining the service and waiting times for the station 100, as further described below. Additionally, as also set forth below, the arriving transactions 110 and departing transactions 114 may be counted for purposes of predicting the benefits that may be gained from a hypothetical expansion of the number k of processors 20. The counting may be performed externally to the computer 10, in accordance with some embodiments of the invention.

In accordance with embodiments of the invention described herein, the occupancy monitor 30 uses what is referred to herein as an "Occupancy Law" to decompose the aggregate response time of the station 100 into the sum of the aggregate transaction service time and the aggregate transaction waiting time, given no information about the individual or aggregate service demands of the transactions.

Figure 5:
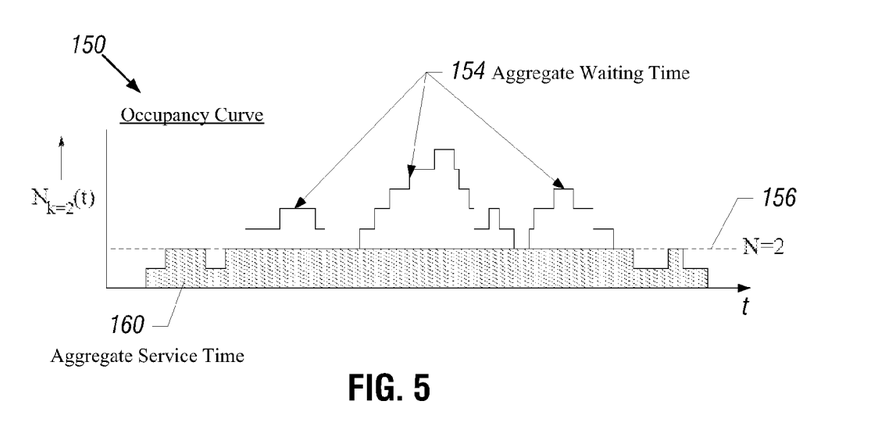
FIG. 5 depicts the relationship of the occupancy curve to an occupancy law according to an embodiment of the invention.

FIG. 5 depicts an exemplary occupancy curve 150 for a two processor station 100 (i.e., having an occupancy curve called "$N_{k=2}(t)$") and graphically illustrates the decomposition. Referring to FIG. 5, the number of processors 20 that are busy at time t is the lesser of $N_k(t)$ and k. Therefore, a horizontal line 156 through the occupancy curve at N=k (k=2 for FIG. 5) divides the occupancy curve into two regions: 1.) an area 160 beneath both the horizontal line 156 and the occupancy curve 150 itself, which represents an aggregate transaction service time for the workload; and 2.) the remaining area 154 beneath the occupancy curve 150 but above the horizontal line 156, which corresponds to the aggregate transaction waiting time for the workload. In other words, the line N=k divides the area under the occupancy curve into service time (below the line) and waiting time (above the line).

The Occupancy Law is an operational law because it uses only directly measurable (i.e., "operational") quantities. By contrast, traditional stochastic queuing models involve assumptions about the probability distributions that generate transaction arrivals and service times. Furthermore the Occupancy Law uses only external observations of transaction arrivals and completions and does not require information about the queue discipline or preemption patterns within the queuing station. Additionally, the Occupancy Law does not analyze the service demands of individual transactions. Unlike classical operational laws, the Occupancy Law provides the relative magnitudes of service and queuing times in a black box system. Furthermore, unlike asymptotic and balanced-system "bounding analysis," the Occupancy Law yields exact rather than approximate information about performance quantities of interest.

It is noted that the Occupancy Law provides important information that is not readily available from conventional system-level measurements. Whereas the latter provide only coarse-grained CPU utilization reports, e.g., at 5-minute intervals, the Occupancy Law provides information about both processor utilization and application-level transaction queuing delays. Furthermore the $N_k(t)$ occupancy curve that is analyzed in connection with the Occupancy Law provides instantaneous processor utilization information throughout the observation interval. The inputs used by the Occupancy Law contain far less information than is typically recorded in application-level transaction logs, as only the transaction arrivals and completions are counted as functions of time in accordance with embodiments of the invention.

Figure 6:
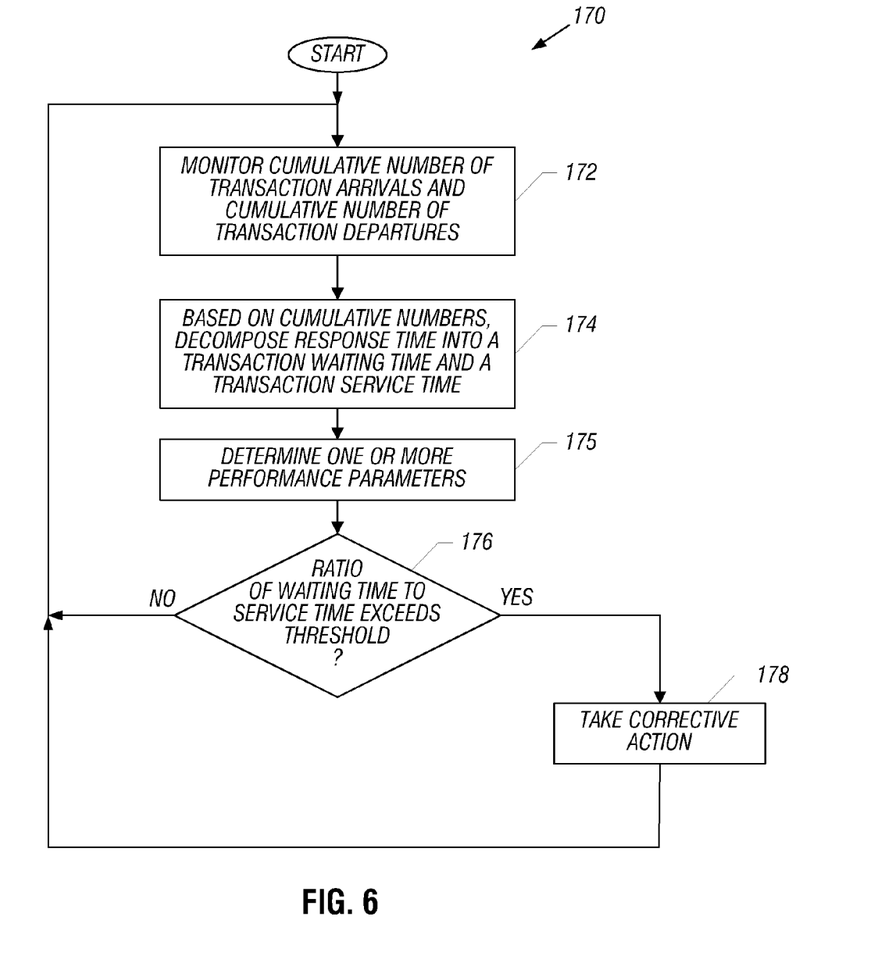
FIG. 6 is a flow diagram depicting a technique to monitor service and queuing delays in a single queue station according to an embodiment of the invention.

Referring to FIG. 6, by applying the Occupancy Law, the occupancy monitor 40 (see also FIG. 1) may perform a technique 170 in accordance with embodiments of the invention. Pursuant to the technique 170, the occupancy monitor 40 monitors (block 172) the cumulative number of transaction arrivals and the cumulative number of transaction departures associated with the application 30 under observation. Based on these cumulative numbers, the occupancy monitor 40 uses the occupancy curve $N_k(t)$ to decompose (174) the response time of the application workload into an aggregate transaction waiting time and an aggregate transaction service time, pursuant to block 174. Based on these parameters, the occupancy monitor 40 may determine one or more indicators of the performance of the application 30, pursuant to block 175. For example, the occupancy monitor 40 may determine a CPU utilization of the workload. It is noted that the CPU utilization may be derived from the aggregate service time, as these two quantities are essentially the same except that they are expressed in different units (seconds for the aggregate service time versus a dimensionless scale for the CPU utilization).

As another example, the occupancy monitor 40 may analyze the service and waiting times for purposes of determining whether corrective action should be undertaken due to a relatively excessive waiting time. For example, if the occupancy monitor 40 determines (diamond 176) that the ratio of the waiting time to the service time exceeds a predetermined threshold, then the occupancy monitor 40 may initiate or take corrective action, pursuant to block 178. For example, the occupancy monitor 40 may generate an alarm for a human operator. The alarm may take on numerous forms, such as an email, text messages, visual alarm, audible alarm, etc., depending on the particular embodiment of the invention.

It is noted that the technique 170 may take additional and/or different corrective actions, in accordance with other embodiments of the invention. For example, in accordance with some embodiments of the invention, the corrective action may involve triggering, initializing or taking an automatic action. For example, the corrective action may involve automatically adding additional processors 20 based on the determined ratio. Thus, the corrective action may involve automated decision making.

An extension to the foregoing analysis allows capacity planning to explicitly take into account the degree of potential parallelism inherent in an application-level workload. A particular challenge is how to predict the reduction in aggregate waiting time that would result from increasing the number of processors in the station 100 while holding the workload constant.

For purposes of predicting the benefits gained from processor expansion, it is first noted that transaction arrivals and departures in a station 100 with k processors 20 may be passively observed, which permits a determination of the occupancy curve $N_k(t)$. In accordance with embodiments of the invention, based on the monitored arrivals and departures, the expansion monitor 50 (see also FIG. 1) predicts the potential benefits of increasing the number of processors to k'>k, with all of the processors 20, both new and old, being identical. It is noted that the expansion monitor 50 does not record and replay the workload on a system with k' processors. Therefore, the occupancy curve $N_k(t)$ for the hypothetical expanded processor station is not directly observable.

Figure 7:
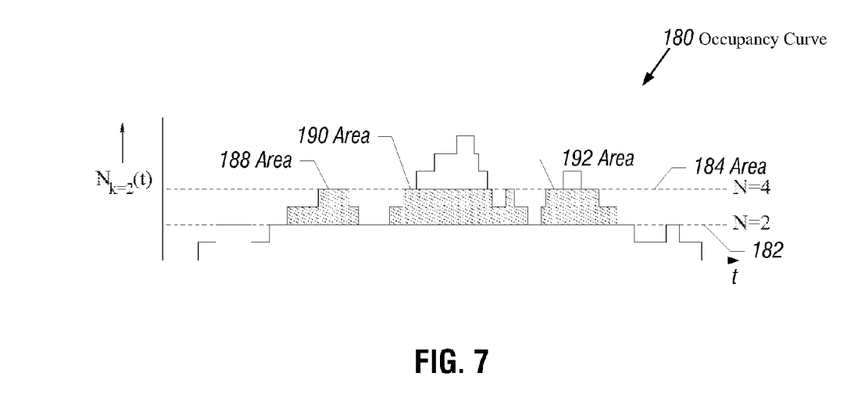
FIG. 7 depicts an occupancy curve illustrating a capacity expansion law according to an embodiment of the invention.

For purposes of illustrating expansion of a station 100 from two to four processors 20, FIG. 7 depicts an exemplary occupancy curve 180 for a two processor station 100 (i.e., $N_{k=2}(t)$). It may be tempting to falsely conclude that the reduction in transaction waiting time is exactly equal to the summation of the areas 188, 190 and 192 between the horizontal lines 184 (N=4) and 182 (N=2). This is not true, however, as illustrated in the counter example of FIGS. 8 and 9.

Figure 8:
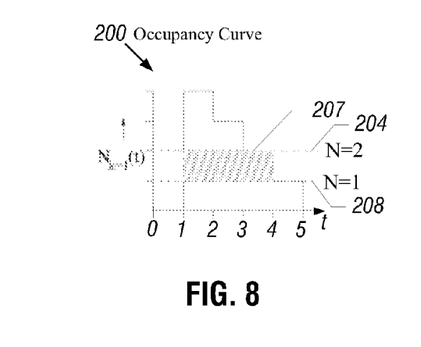
FIGS. 8 and 9 depict occupancy curves illustrating the use of the capacity expansion law to predict a minimum reduction in queuing time that may be achieved by expanding the number of processors of a station according to an embodiment of the invention.
Figure 9:
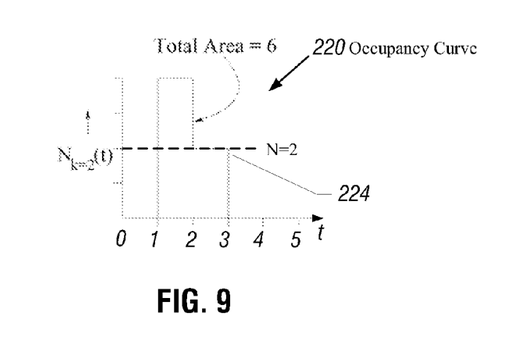

More specifically, as depicted in FIG. 8, a processor station 100 processes four transactions (below a horizontal line 208 (N=1)). It is tempting to falsely conclude that the shaded area 207 between the horizontal lines 204 (N=2) and 208 (N=1) is exactly equal to the reduction in aggregate waiting time that would result from increasing the number of processors 20 from one to two. However the simple counterexample illustrated in FIG. 9 shows that the reduction in aggregate waiting time is sometimes strictly greater than the area between the two horizontal lines. More specifically, FIG. 9 depicts an occupancy curve 220 that results from the expansion of the station 100 from one to two processors 20. It is noted that with the expansion, the aggregate waiting time is two, which is four aggregate time units less than the aggregate waiting time depicted in FIG. 1. Therefore, the aggregate waiting time has been reduced by four time units, instead of three time units, which is the area between the horizontal lines 204 and 208 of FIG. 8.

In accordance with embodiments of the invention described herein, a "Capacity Expansion Law" is introduced, which states that the area beneath the occupancy curve and between the two horizontal lines N=k and N=k' is a lower bound on the reduction in aggregate waiting time, which can be obtained by increasing the number of processors from k to k'. While this reduction can be obtained, and indeed can be obtained straightforwardly, it is still possible to fail to achieve it. For example, if the queuing discipline is radically changed while adding new processors, the queuing delays may increase. In general, the Capacity Expansion Law provides a minimum reduction in waiting time that can be achieved, so long as the queuing discipline is not changed to its detriment.

The Capacity Expansion Law describes how the addition of processors 20 transforms the original occupancy curve for the station 100 with k processors 20 into a new occupancy curve for the expanded station 100 with k'>k processors. This transformation may be understood incrementally: each step in the process replaces queuing delay with service time and introduces no new queuing delay. In the end, the total queuing delay eliminated equals at least the lower bound, which is guaranteed by the Capacity Expansion Law.

Figure 10:
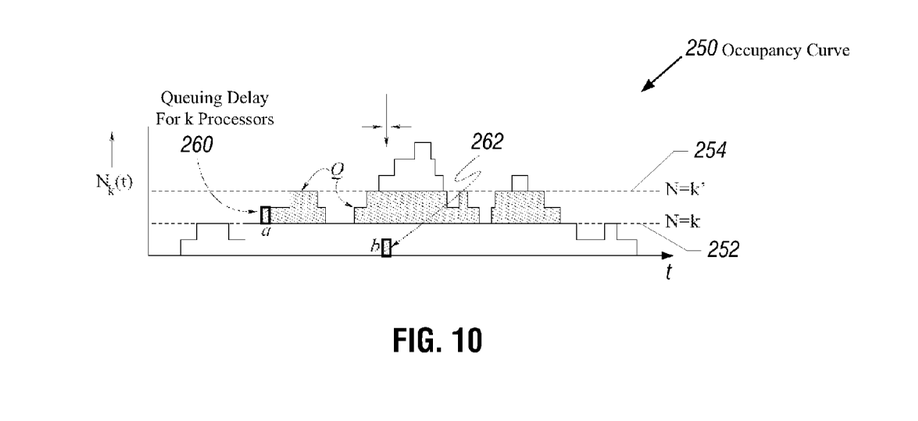
FIG. 10 depicts an occupancy curve illustrating changes in a workload due to processor expansion according to an embodiment of the invention.

FIG. 10 graphically illustrates the expansion. "Q" denotes the shaded regions beneath an occupancy curve $N_k(t)$ 250 and between horizontal lines N=k 252 and N=k' 254. A small rectangle 260 in the leftmost part of the leftmost Q region represents a queuing delay for some transaction in the system with k processors 20, but in the expanded system with k' processors, the transaction can be served immediately because it occupies one of the first k'–k positions at the head of the queue smaller system. The additional processors have converted the queuing delay represented by rectangle 260 into service time.

The sum of service demands across all transactions in the workload is constant. By serving immediately a transaction that would have queued in the smaller system, the additional processors in the larger system "steal future employment" from the original processors. The rectangle 260 therefore has a corresponding rectangle 262 (or rectangles) of equal area to the right of the rectangle 206 and beneath the N=k line. When the service time represented by rectangle 262 is relocated into the position of rectangle 260, the occupancy curve above the previous position of rectangle 260 is decremented by one. Graphically, this corresponds to a downward shift of the occupancy curve above the rectangle 262.

The net effect is a new occupancy curve corresponding to a feasible scheduling of transactions onto k' processors 20, with a reduction in queuing delay equal to or greater than the area of the rectangle 260. Similar reasoning allows a sweep across FIG. 10 from left to right, relocating chunks of service time from beneath the N=k line to the shaded area Q until all of the queuing delays represented by Q have been eliminated. No new queuing delays are introduced by this process.

The Capacity Expansion Law assumes a work-conserving scheduler that, in general, employs the original k processors 20 no less efficiently in the enlarged system than in the smaller original system. Again, it is possible to arrange for the enlarged system to suffer greater aggregate queuing delay than the smaller system. Consider, for example, a system with an initially large number of processors that schedules transactions in shortest-job-first fashion. If a single additional processor is added and also, the scheduling discipline is changed to longest job first, the harm inflicted via wasteful scheduling may easily outweigh the minor benefits of a single additional processor. Thus, for this example, the queuing delay reduction that is predicted by the Capacity Expansion Law is not obtained. Such scenarios are highly unlikely, however, in practice.

Figure 11:
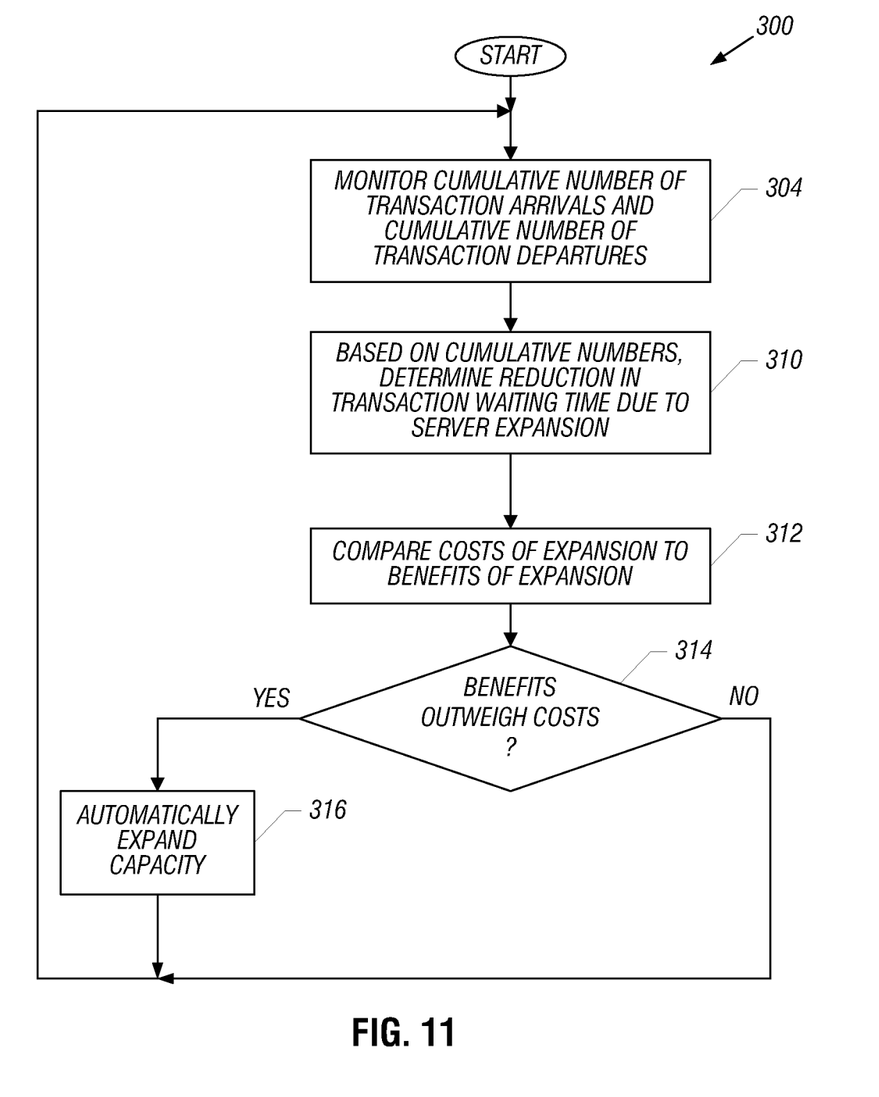
FIG. 11 is a flow diagram depicting a technique to determine a reduction in transaction waiting time due to processor expansion according to an embodiment of the invention.

Thus, in accordance with some embodiments of the invention, the expansion monitor 50 (see also FIG. 1) may perform a technique 300 that is depicted in FIG. 11 in accordance with the Capacity Expansion Law. Pursuant to the technique 300, the expansion monitor 50 monitors (block 304) the cumulative number of transaction arrivals and the cumulative number of transaction departures. Based on the cumulative number of transaction arrivals and departures, the expansion monitor 50 uses the occupancy curve $N_k(t)$ to determine pursuant to block 310, the minimum reduction in transaction waiting due to processor expansion. The result of this determination may be displayed on a monitor, may be emailed, may otherwise be displayed on an output device and/or may be used to trigger an automated response.

For example, the capacity may be automatically expanded when the Capacity Expansion Law indicates that the benefits exceed a threshold based on the costs (e.g., electric power cost or some other cost) of expanded capacity. More specifically, in accordance with some embodiments of the invention, the technique 300 includes, based on the determined reduction in transaction waiting time, comparing (block 312) the costs of expansion to the benefits of expansion and based on the comparison, determining (block 314) whether to automatically expand capacity, pursuant to block 316. Thus, the capacity monitor 50 may, for example, cause one or more additional processors to be allocated to the application 30 under observation based on the benefit versus cost analysis that is performed by the monitor 50.

It is noted that in accordance with some embodiments of the invention, the occupancy 40 and/or expansion 50 monitors may be executed on a computer system separate from the station 100. Furthermore, in accordance with some embodiments of the invention, the occupancy and/or expansion monitoring may be provided as part of an information technology service. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   monitoring a first cumulative number of transactions arriving into a processing station;
   monitoring a second cumulative number of transactions completed by the station; and
   based on the first and second cumulative numbers, determining at least one of a transaction waiting time of the station and a predicted reduction in the transaction waiting time due to processor expansion, the determination comprising:
   determining a time-varying profile of an occupancy of the processing station, the profile of the occupancy indicating a difference between the number of transactions arriving into the processing station and the number of transactions completed by the station; and
   basing the at least one of the transaction waiting time of the station and the predicted reduction in the transaction waiting time due to processor expansion on a characteristic defined by the profile,
   wherein at least one of the monitoring of the first cumulative number, the monitoring of the second cumulative number and the determining is performed by a processor-based machine.

2. The method of claim 1, wherein the act of determining comprises determining the transaction waiting time, the method further comprising:
   determining a service time of the station based on the first and second cumulative numbers.

3. The method of claim 2, further comprising:
   determining a ratio based on the waiting and service times; and
   selectively taking corrective action based on the ratio.

4. The method of claim 3, wherein the act of selectively taking corrective action comprises:
   comparing the ratio to a threshold; and
   selectively generating an alarm signal or selectively taking an automated action based on the comparison.

5. The method of claim 1, wherein the determining comprises determining a minimum reduction in the transaction waiting time for a hypothetical expansion of processors.

6. The method of claim 5, further comprising:
   automatically analyzing costs associated with the expansion versus benefits associated with the expansion; and
   selectively taking an automated action in response to the analyzing.

7. The method of claim 1, wherein the act of determining comprises:
   determining a difference between the first and second cumulative numbers; and
   determining the reduction in the transaction waiting time based on the difference.

8. The method of claim 1, further comprising providing information technology services, wherein the monitoring and determining tasks are part of the information technology services.

9. A controller comprising:
   at least one central processing unit (CPU); and
   a performance monitor executable on said at least one CPU to:
   monitor a first cumulative number of transactions arriving into a processing station that has multiple processors;
   monitor a second cumulative number of transactions completed by the station; and
   based on the first and second cumulative numbers, determine a time-varying profile of an occupancy of the processing station and determine at least one of a transaction waiting time of the station and a reduction in the transaction waiting time due to processor expansion based at least in part on a characteristic of the profile, the profile of the occupancy indicating a difference between the number of transactions arriving into the processing station and the number of transactions completed by the station.

10. The controller of claim 9, wherein the performance monitor determines the waiting time and determines a service time of the station based on the first and second cumulative numbers.

11. The controller of claim 9, wherein the performance monitor determines a minimum reduction in the transaction waiting time for a hypothetical expansion of processors of the station.

12. An article comprising a non-transitory computer readable storage medium to store instructions that when executed by a processor-based system cause the processor-based system to:
> monitor a first cumulative number of transactions arriving into a single queue station that has multiple processors;
> monitor a second cumulative number of transactions completed by the station; and
> based on the first and second cumulative numbers, determine a time-varying profile of an occupancy of the processing station and determine at least one of a transaction waiting time of the station and a reduction in the transaction waiting time due to processor expansion based at least in part on a characteristic of the profile, the profile of the occupancy indicating a difference between the number of transactions arriving into the processing station and the number of transactions completed by the station.

13. The article of claim 12, the storage medium storing instructions that when executed by the processor-based system cause the processor-based system to determine the waiting time and determine a service time of the station based on the first and second cumulative numbers.

14. The article of claim 12, the storage medium storing instructions that when executed by the processor-based system cause the processor-based system to:
> determine a service time based on the first and second cumulative numbers,
> determine ratio based on the waiting and service times, and
> selectively take corrective action based on the ratio.

15. The article of claim 14, the storage medium storing instructions that when executed by the processor-based system cause the processor-based system to determine a minimum reduction in the transaction waiting time for a hypothetical expansion of processors in the station.

16. The method of claim 1, further comprising basing the determination of the at least one of the transaction waiting time of the station and the predicted reduction in the transaction waiting time due to processor expansion on an area defined by the profile.

17. The controller of method of claim 9, wherein the performance monitor is adapted to further base the determination of the at least one of the transaction waiting time of the station and the predicted reduction in the transaction waiting time due to processor expansion on an area defined by the profile.

18. The article of claim 9, the storage medium storing instructions that when executed by the processor-based system cause the processor-based system to further base the determination of the at least one of the transaction waiting time of the station and the predicted reduction in the transaction waiting time due to processor expansion on an area defined by the profile.

* * * * *